(12) United States Patent
Bae

(10) Patent No.: US 12,499,070 B2
(45) Date of Patent: Dec. 16, 2025

(54) SEMICONDUCTOR DEVICE AND ELECTRONIC DEVICE CAPABLE OF REDUCING INTERNAL LINE PATTERN COMPLEXITY AND AREA AND COMMUNICATION METHOD THEREOF

(71) Applicant: LX SEMICON CO., LTD., Daejeon (KR)

(72) Inventor: Jung Yang Bae, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 128 days.

(21) Appl. No.: 18/459,650

(22) Filed: Sep. 1, 2023

(65) Prior Publication Data

US 2024/0078203 A1 Mar. 7, 2024

(30) Foreign Application Priority Data

Sep. 2, 2022 (KR) ........................ 10-2022-0111280

(51) Int. Cl.
*G06F 13/38* (2006.01)
*G06F 13/40* (2006.01)
*G06F 13/42* (2006.01)

(52) U.S. Cl.
CPC ........ *G06F 13/387* (2013.01); *G06F 13/4054* (2013.01); *G06F 13/4204* (2013.01)

(58) Field of Classification Search
CPC . G06F 13/387; G06F 13/4054; G06F 13/4204
See application file for complete search history.

(56) References Cited

U.S. PATENT DOCUMENTS

| 2015/0301979 | A1* | 10/2015 | Mishra | G06F 13/4022 710/106 |
| 2017/0075852 | A1* | 3/2017 | Mishra | G06F 13/4282 |
| 2018/0232324 | A1* | 8/2018 | Mishra | G06F 13/404 |
| 2020/0242066 | A1* | 7/2020 | Lee | G06F 13/24 |

OTHER PUBLICATIONS

European Search Report issued for European Appln. No. 23194326.7 dated Dec. 22, 2023, 8 pages.

* cited by examiner

*Primary Examiner* — Eric T Oberly
(74) *Attorney, Agent, or Firm* — ROTHWELL, FIGG, ERNST & MANBECK, P.C.

(57) ABSTRACT

Disclosed herein is a semiconductor device including a processor that processes input data received via a bus and transmits the process input data as output data via the bus; an input/output data converter that receives the output data via the bus, converts the output data into transmit preGPIO data, and transmits the transmit preGPIO data to the bus; and a GPIO input/output unit that receives the transmit preGPIO data via the bus, converts the transmit preGPIO data into transmit GPIO data, and outputs the transmit GPIO data to at least one GPIO pad.

20 Claims, 14 Drawing Sheets

Prior Art

SEMICONDUCTOR DEVICE AND ELECTRONIC DEVICE CAPABLE OF REDUCING INTERNAL LINE PATTERN COMPLEXITY AND AREA AND COMMUNICATION METHOD THEREOF

This application claims the benefit of Korean Patent Application No. 10-2022-0111280, filed on Sep. 2, 2022, which is hereby incorporated by reference as if fully set forth herein.

BACKGROUND

Technical Field

The present disclosure relates to a semiconductor device, and a communication method in the semiconductor device.

BACKGROUND

With the development of semiconductor integration technology, a system on chip (SOC) has emerged in which blocks that respectively perform functions that are conventionally implemented using separate independent chips is integrated into one chip. A system on a chip may be used in a variety of electronic devices. A system on a chip may include a processor and peripheral blocks connected to the processor. A system on a chip may include a bus that connects the processor and the peripheral blocks to each other.

At least one of the peripheral blocks included in the system-on-chip may perform serial communication with other peripheral blocks included in the system-on-chip or a chip or a semiconductor device outside the system-on-chip. The block performing the serial communication may be referred to as a serial communication interface. The serial communication interface may perform the serial communication with the other peripheral blocks or the chip outside the system-on-chip while complying with a pre-agreed serial communication standard.

For example, as shown in FIG. 1, in a semiconductor device as the system-on-chip, a processor 100 is connected to an input/output data converter 200 and a GPIO (general-purpose input/output) input/output unit 300 via a bus 1000. The input/output data converter 200 is connected to a plurality of pads 3000 via a first input/output line 2001, and the GPIO input/output unit 300 is connected to the plurality of pads 3000 via a second input/output line 2002. Specifically, the input/output data converter 200 may be connected to a multiplexer MUX via the first input/output line 2001 to input or output data via the plurality of pads 3000, and may input or output the data from or to a pad 3000 selected by the multiplexer MUX. Furthermore, the GPIO input/output unit 300 may be connected to the multiplexer MUX via the second input/output line 2002 to input or output data via the plurality of pads 3000, and may input or output the data from or to a pad 3000 selected by the multiplexer MUX.

That is, the conventional semiconductor device requires each input/output line and the multiplexer MUX to control the data input from or output to the pad from the plurality of peripheral blocks. Thus, line complexity may be increased, and an area of the semiconductor device may be increased.

SUMMARY

A technical purpose of the present disclosure is to provide a semiconductor device capable of reducing internal line pattern complexity of the semiconductor device and reducing an area of the semiconductor device.

A semiconductor device according to one embodiment of the present disclosure includes a processor that processes input data received via a bus and transmits the process input data as output data via the bus; an input/output data converter that receives the output data via the bus, converts the output data into transmit preGPIO data, and transmits the transmit preGPIO data to the bus; and a GPIO input/output unit that receives the transmit preGPIO data via the bus, converts the transmit preGPIO data into transmit GPIO data, and outputs the transmit GPIO data to at least one GPIO pad, wherein the input/output data converter is configured to convert the output data into transmit protocol data corresponding to a communication protocol of the output data, and convert the transmit protocol data into the transmit preGPIO data.

The semiconductor device according to the present disclosure converts a communication protocol into data in a specific form and transmits the data in the specific form via the bus. Thus, the complexity of the internal line pattern may be reduced.

Furthermore, in the semiconductor device according to the present disclosure, a multiplexer (MUX) that controls input/output of data may be omitted. Thus, the area of the semiconductor device may be minimized.

BRIEF DESCRIPTION OF THE DRAWINGS

The accompanying drawings, which are included to provide a further understanding of the present disclosure and are incorporated in and constitute a part of this application, illustrate embodiment(s) of the present disclosure and together with the description serve to describe the principle of the present disclosure. In the drawings.

DETAILED DESCRIPTION

Figure 1:
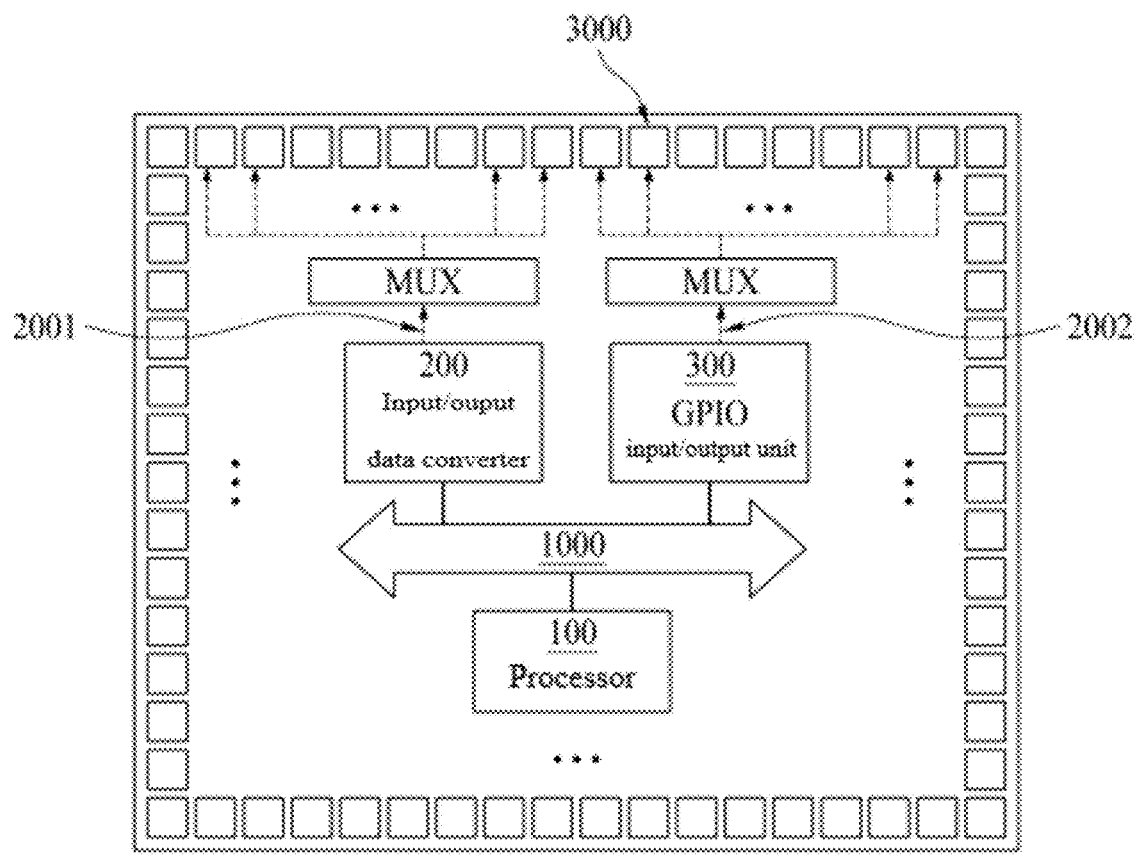
FIG. 1 is an example block diagram of a conventional semiconductor device.

Advantages and features of the present disclosure, and a method of achieving the advantages and features will become apparent with reference to embodiments described later in detail together with the accompanying drawings. However, the present disclosure is not limited to the embodiments as disclosed below, but may be implemented in various different forms. Thus, these embodiments are set forth only to make the present disclosure complete, and to completely inform the scope of the present disclosure to those of ordinary skill in the technical field to which the present disclosure belongs, and the present disclosure is only defined by the scope of the claims.

For simplicity and clarity of illustration, elements in the drawings are not necessarily drawn to scale. The same reference numbers in different drawings represent the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure. Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

A shape, a size, a ratio, an angle, a number, etc. disclosed in the drawings for describing embodiments of the present disclosure are illustrative, and the present disclosure is not limited thereto. The same reference numerals refer to the same elements herein.

The terminology used herein is directed to the purpose of describing particular embodiments only and is not intended to be limiting of the present disclosure. As used herein, the singular constitutes "a" and "an" are intended to include the plural constitutes as well, unless the context clearly indicates otherwise. It will be further understood that the terms "comprise", "comprising", "include", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of associated listed items. Expression such as "at least one of" when preceding a list of elements may modify the entire list of elements and may not modify the individual elements of the list. In interpretation of numerical values, an error or tolerance therein may occur even when there is no explicit description thereof.

It will be understood that when an element or layer is referred to as being "connected to", or "connected to" another element or layer, it may be directly on, connected to, or connected to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

In descriptions of temporal relationships, for example, temporal precedent relationships between two events such as "after", "subsequent to", "before", etc., another event may occur therebetween unless "directly after", "directly subsequent" or "directly before" is not indicated.

When a certain embodiment may be implemented differently, a function or an operation specified in a specific block may occur in a different order from an order specified in a flowchart. For example, two blocks in succession may be actually performed substantially concurrently, or the two blocks may be performed in a reverse order depending on a function or operation involved.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described under could be termed a second element, component, region, layer or section, without departing from the spirit and scope of the present disclosure.

The features of the various embodiments of the present disclosure may be partially or entirely combined with each other, and may be technically associated with each other or operate with each other. The embodiments may be implemented independently of each other and may be implemented together in an association relationship.

In interpreting a numerical value, the value is interpreted as including an error range unless there is no separate explicit description thereof.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a semiconductor device according to an embodiment of the present disclosure will be described in detail with reference to FIGS. 2 to 10B.

Figure 2:
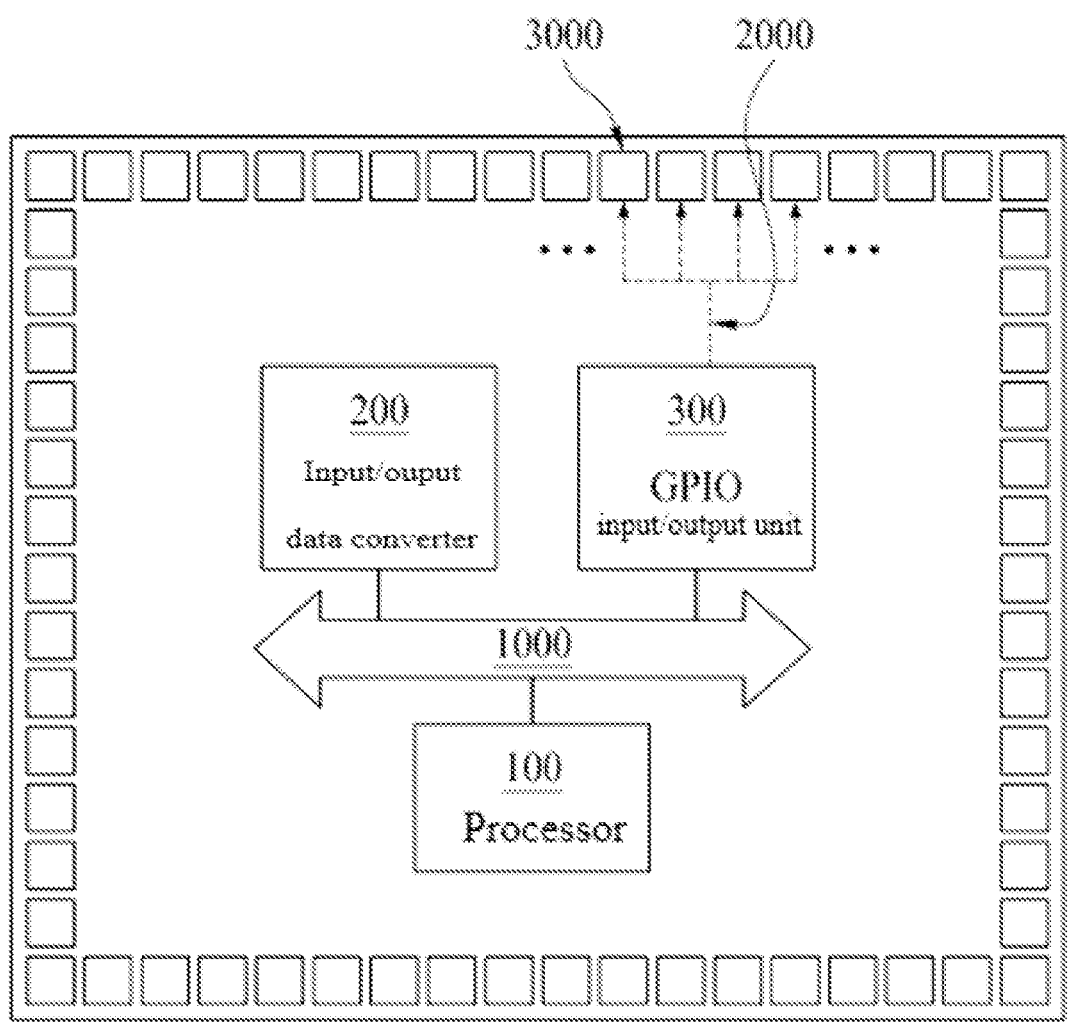
FIG. 2 is a block diagram of a semiconductor device according to an embodiment of the present disclosure.
Figures 3, 4:
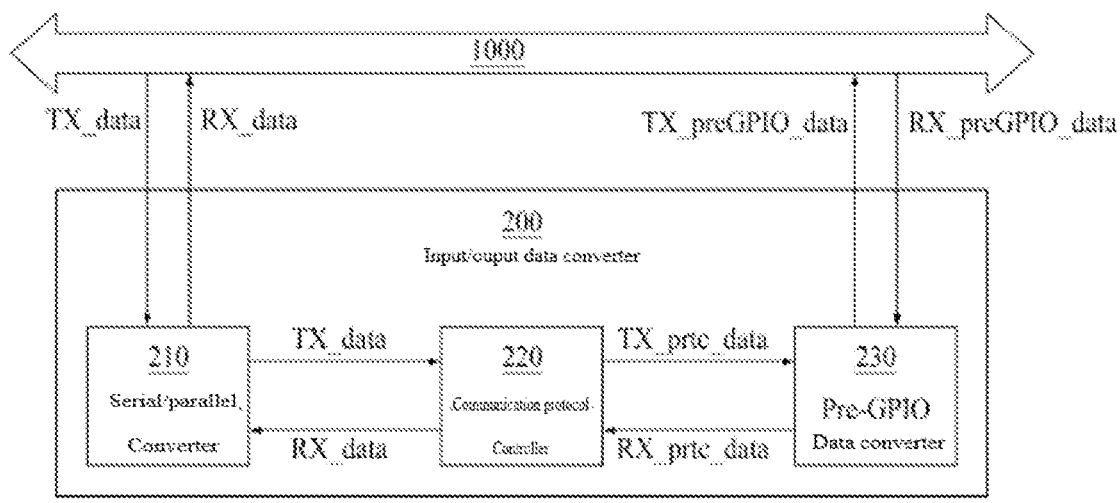
FIG. 3 is a block diagram of an input/output data converter according to an embodiment of the present disclosure.
FIG. 4 is a diagram showing a structure of data received by a GPIO data converter from a processor according to an embodiment of the present disclosure.
Figure 5:
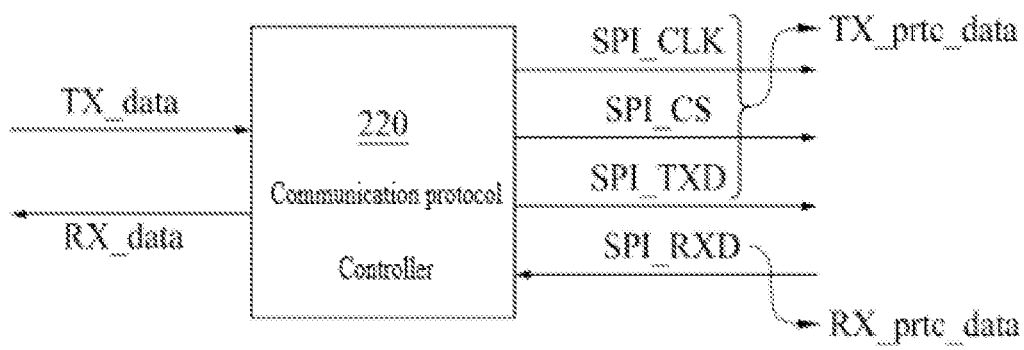
FIG. 5 is an example block diagram of an input/output data converter according to an embodiment of the present disclosure.
Figure 6A:
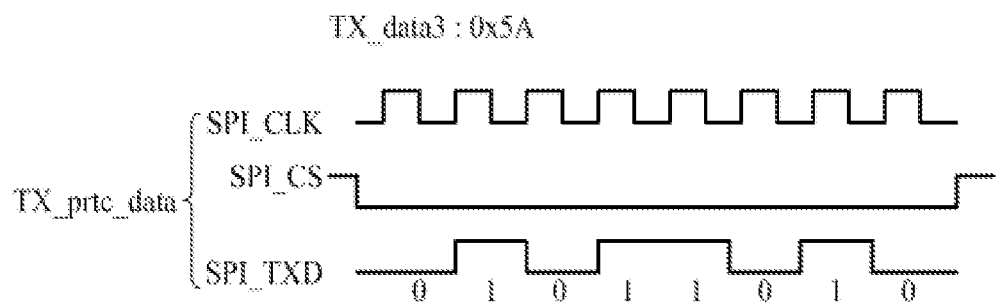
FIG. 6A is a diagram showing a signal transmitted from an input/output data converter to a GPIO input/output unit according to an embodiment of the present disclosure.
Figure 6B:
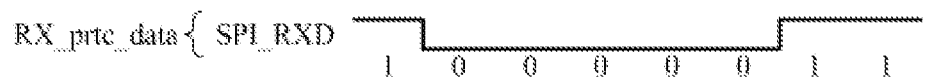
FIG. 6B is a diagram showing a signal input from a GPIO input/output unit to an input/output data converter according to an embodiment of the present disclosure.
Figure 7:
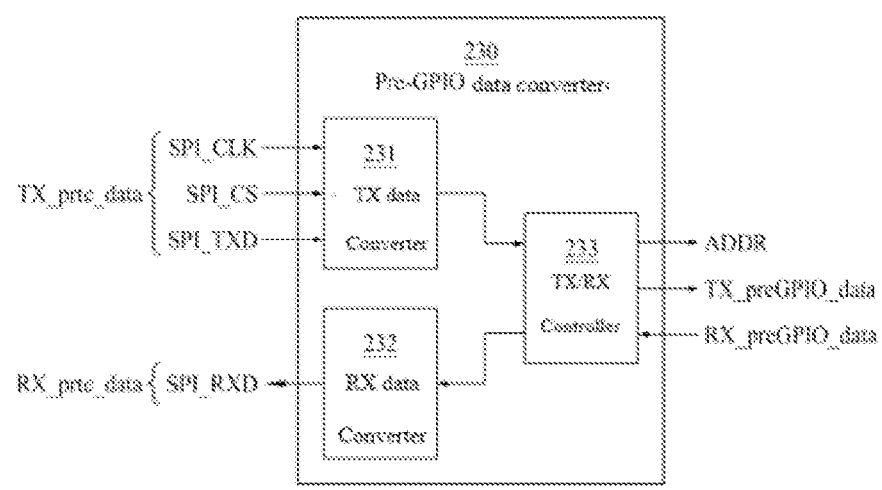
FIG. 7 is a block diagram of a bus communication data converter according to an embodiment of the present disclosure.
Figure 8A:
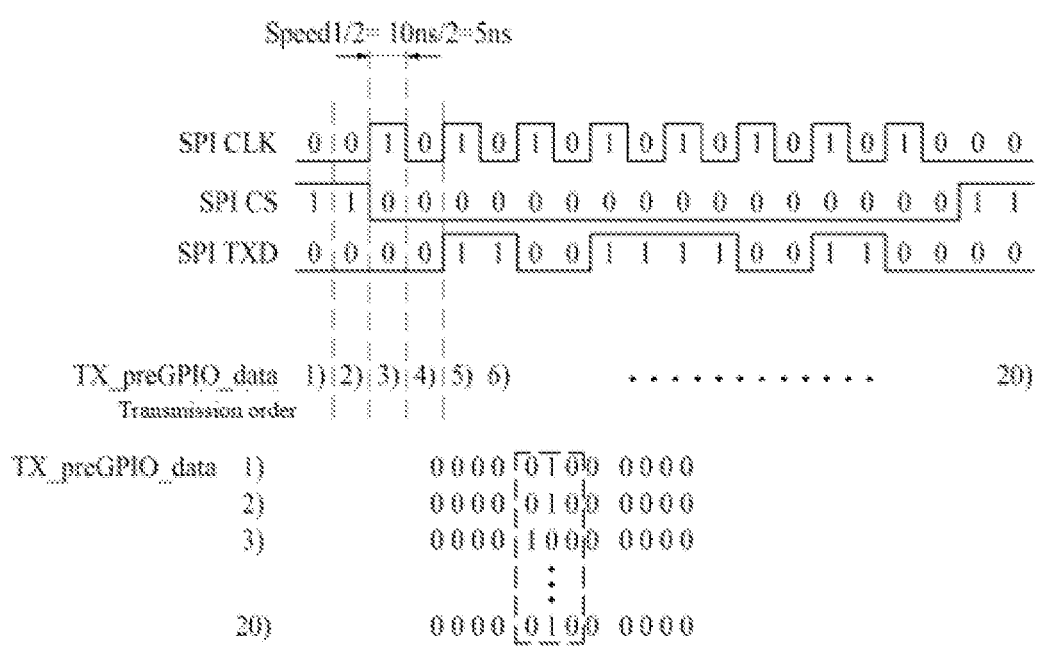
FIG. 8A is a diagram showing a signal transmitted from a bus communication data converter to a GPIO input/output unit according to an embodiment of the present disclosure.
Figure 8B:
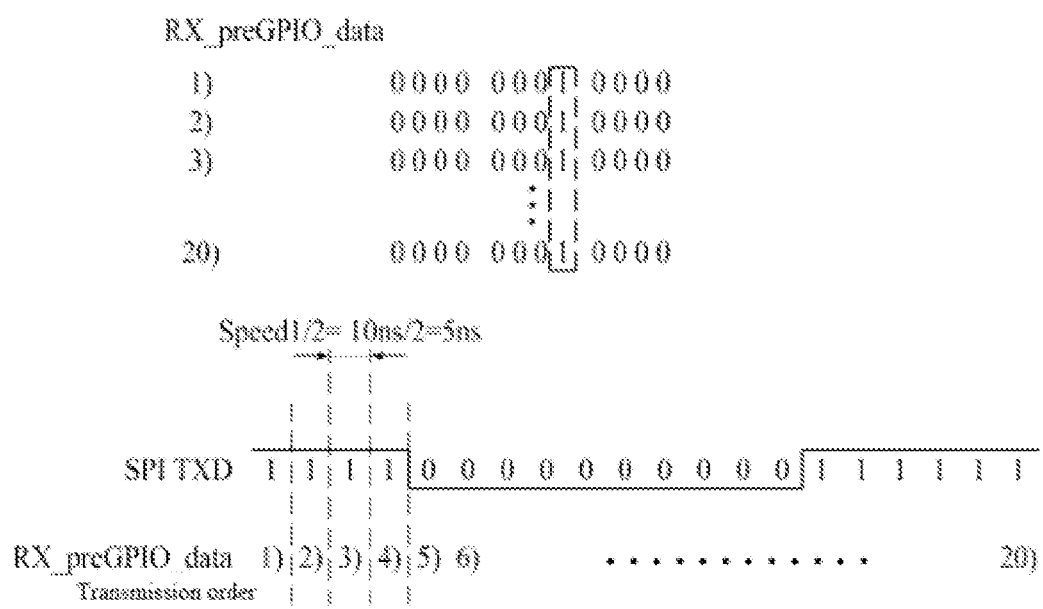
FIG. 8B is a diagram showing a signal received by a bus communication data converter from a GPIO input/output unit according to an embodiment of the present disclosure.
Figure 9:
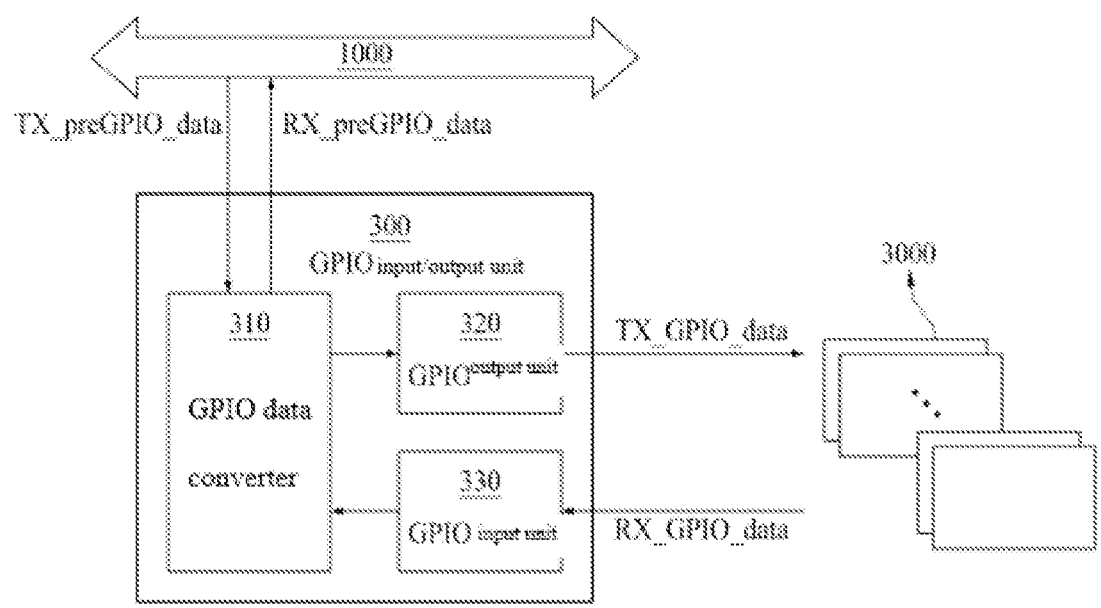
FIG. 9 is a block diagram of a GPIO input/output unit according to an embodiment of the present disclosure.
Figure 10A:
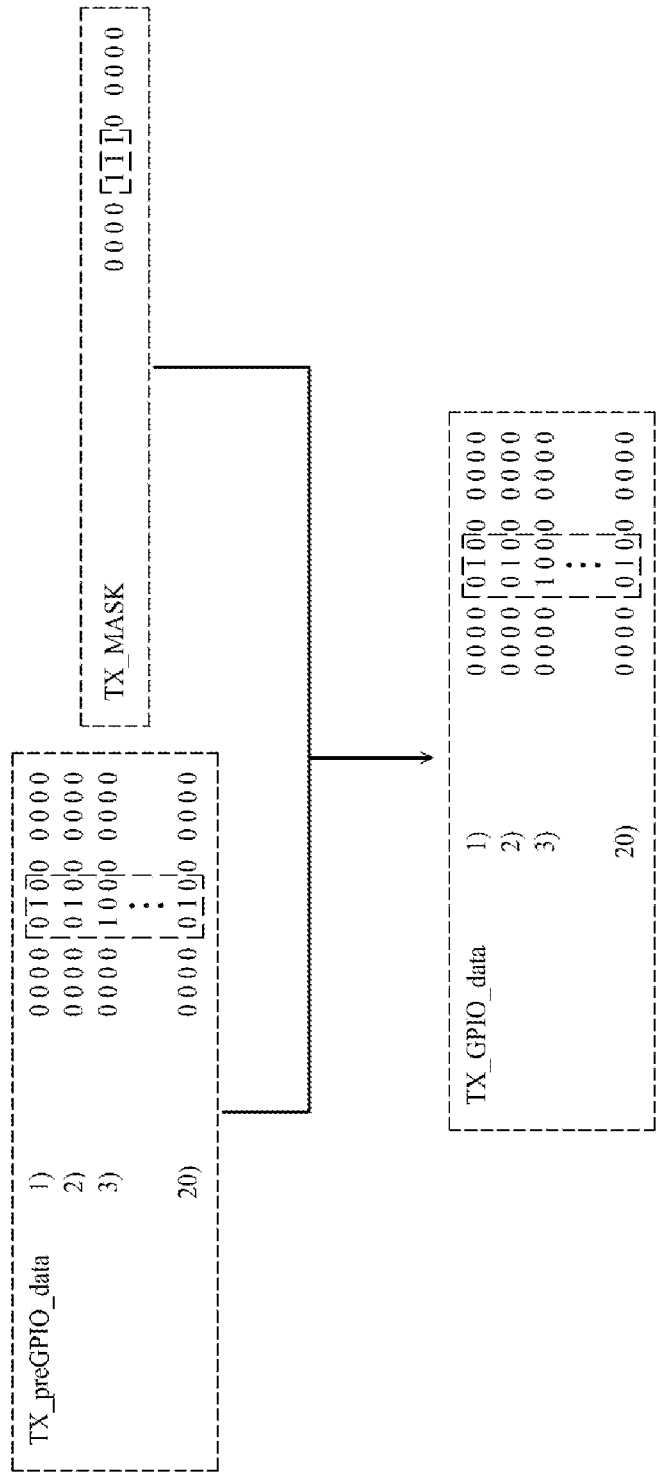
FIG. 10A is a diagram illustrating a process of converting transmit preGPIO data into transmit GPIO data in a GPIO input/output unit according to an embodiment of the present disclosure.
Figure 10B:
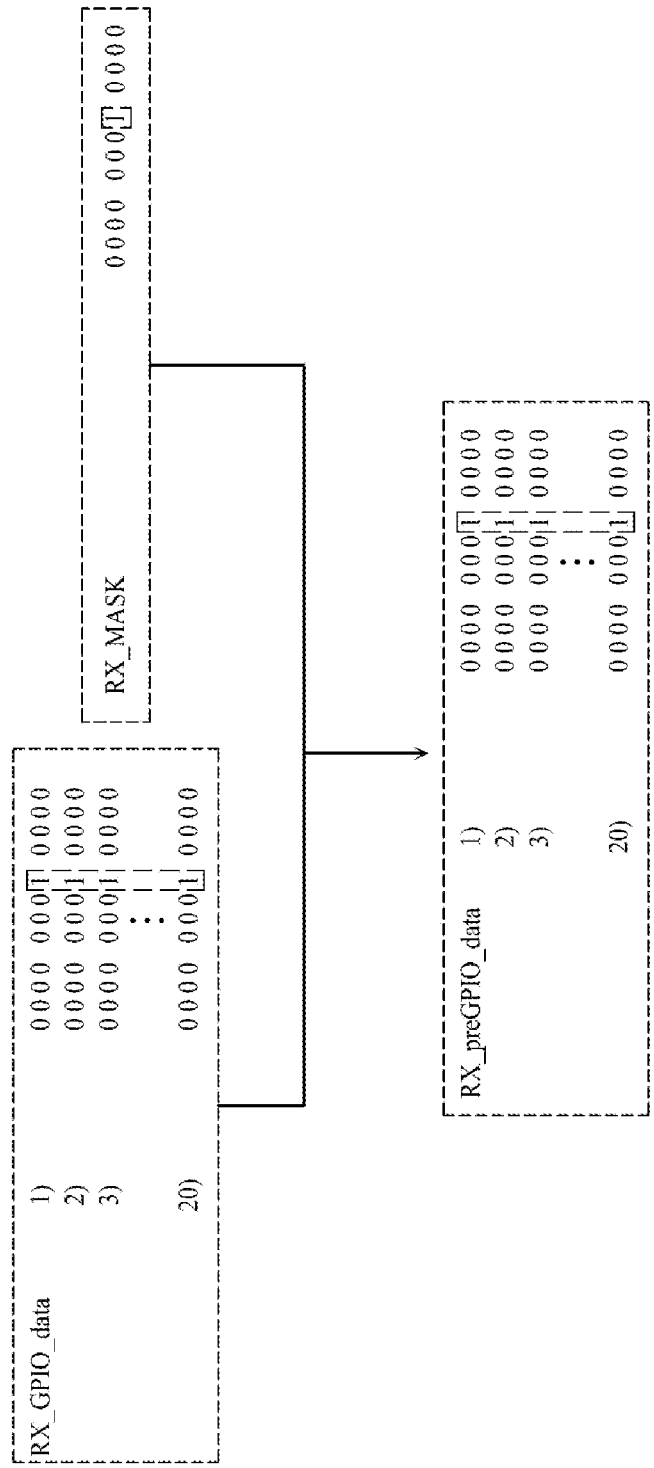
FIG. 10B is a diagram illustrating a process of converting receive preGPIO data into receive GPIO data in a GPIO input/output unit according to an embodiment of the present disclosure.

FIG. 2 is a block diagram of a semiconductor device according to an embodiment of the present disclosure. FIG. 3 is a block diagram of an input/output data converter according to an embodiment of the present disclosure, and FIG. 4 is a diagram showing a structure of data received by a GPIO data converter from a processor according to an embodiment of the present disclosure. FIG. 5 is an example block diagram of an input/output data converter according to an embodiment of the present disclosure. FIG. 6A is a diagram showing a signal transmitted from an input/output data converter to a GPIO input/output unit according to an embodiment of the present disclosure. FIG. 6B is a diagram showing a signal input from a GPIO input/output unit to an input/output data converter according to an embodiment of the present disclosure. FIG. 7 is a block diagram of a bus communication data converter according to an embodiment of the present disclosure. FIG. 8A is a diagram showing a signal transmitted from a bus communication data converter to a GPIO input/output unit according to an embodiment of the present disclosure. FIG. 8B is a diagram showing a signal received by a bus communication data converter from a GPIO input/output unit according to an embodiment of the present disclosure. FIG. 9 is a block diagram of a GPIO input/output unit according to an embodiment of the present disclosure. FIG. 10A is a diagram illustrating a process of converting transmit preGPIO data into transmit GPIO data in a GPIO input/output unit according to an embodiment of the present disclosure. FIG. 10B is a diagram illustrating a process of converting receive preGPIO data into receive GPIO data in a GPIO input/output unit according to an embodiment of the present disclosure.

Referring to FIG. 2, a semiconductor device according to an embodiment of the present disclosure includes a processor 100, an input/output data converter 200, a GPIO input/output unit 300, a bus 1000, a GPIO input/output line 2000, and at least one pad 3000.

The processor 100 may process input data RX_data received from the input/output data converter 200 and transmit the processed data as output data TX_data. For example, the processor 100 may be a timing controller or a display driving integrated circuit for providing image data to a display device, a memory controller for controlling memory devices, or a central processing unit (CPU) that operates based on software in a memory. However, the present disclosure is not limited thereto, and as described above, the processor 100 may be a component that processes the input data and outputs processed data.

As shown in FIG. 3, the input/output data converter 200 converts output data TX_data received from the processor 100 via the bus 1000 into transmit preGPIO data TX_preGPIO_data and outputs the transmit preGPIO data TX_preGPIO_data to the GPIO input/output unit 300 via the bus 1000, and converts receive preGPIO data RX_preGPIO_data received from the GPIO input/output unit 300 into input data RX_data and outputs the input data RX_data to the processor 100 via the bus 1000. In this regard, the output data TX_data received from the processor 100 includes first to third output data TX_data1 to TX_data3, as shown in FIG. 4. The first output data TX_data1 indicates information about the communication protocol of the output data TX_data, and may have different values depending on the communication protocol of the output data TX_data. The second output data TX_data2 indicates information about a GPIO pad from which the data is output among the GPIO pads 3000. Furthermore, the third output data TX_data3 may include the data processed by the processor 100 as described above. For example, the output data TX_data may include the first output data TX_data1 having a value of "11(2)" meaning a SPI protocol, the second output data TX_data2 having a value of "0000 1111 0000" indicating using middle 4 GPIO pads among 12 GPIO pads, and the third output data TX_data3 as the data processed by the processor 100 having a value of "0101 1010(0x5A)". Although not shown, like the output data TX_data, the input data RX_data may include first input data RX_data1 as information about a communication protocol, second input data RX_data2 as information about a GPIO pad to which the data is input among the GPIO pads 3000, and third input data RX_data3 as the data input to the GPIO pad.

As shown in FIG. 3, the input/output data converter 200 may include a serial/parallel converter 210, a communication protocol controller 220, and a Pre-GPIO data converter 230.

The serial/parallel converter 210 may convert the output data TX_data received from the processor 100 via the bus 1000 and the input data RX_data received from the communication protocol controller 220 via the bus 1000 into serial or parallel data. For example, the serial/parallel converter 210 may convert the output data TX_data received in parallel from the processor 100 into serial data or may convert the input data RX_data received in serial from the communication protocol controller 220 into parallel data. However, the present disclosure is not limited thereto, and the serial/parallel converter 210 may convert the output data TX_data received in serial from the processor 100 into parallel data, or may convert the input data RX_data received in parallel from the communication protocol controller 220 into serial data.

The communication protocol controller 220 converts the output data TX_data having been converted into the serial or parallel data into transmit protocol data TX_prtc_data corresponding to a corresponding communication protocol and transmits the transmit protocol data TX_prtc_data to the Pre-GPIO data converter 230. In this regard, the transmit protocol data TX_prtc_data may include at least one protocol data according to the protocol of the output data TX_data. Specifically, the transmit protocol data TX_prtc_data may include at least one protocol data according to the communication protocol corresponding to the first output data TX_data1 of the output data TX_data. For example, when the protocol of the output data TX_data is a SPI (Serial Peripheral Interface) communication protocol, the communication protocol controller 220 may convert the received output data TX_data to the transmit protocol data TX_prtc_data according to the SPI communication protocol, as shown in FIG. 5 and FIG. 6A. In this regard, the transmit protocol data TX_prtc_data may include SPI clock data SPI_CLK, SPI chip select data SPI_CS, and SPI transmit data SPI_TXD as protocol data. Although described based on the SPI protocol, the present disclosure is not limited thereto. As described above, the transmit protocol data TX_prtc_data may include at least one protocol data according to the communication protocol of the output data TX_data. For example, the communication protocol controller 220 may convert the output data TX_data to data based on the serial communication protocol such as I2C (Inter-Integrated Circuit) communication protocol and UART (Universal Asynchronous Receiver/Transmitter) communication protocol other than the SPI communication protocol. The communication protocol controller 220 may convert the output data TX_data to data based on a communication protocol other than the aforementioned communication protocol.

The communication protocol controller 220 converts receive protocol data RX_prtc_data received from the Pre-GPIO data converter 230 into the input data RX_data and transmits the input data RX_data to the serial/parallel converter 210. Specifically, the communication protocol controller 220 extracts receive preGPIO data RX_preGPIO_data and converts the extracted data into the receive protocol data RX_prct_data based on a timing at which the data is transmitted. That is, the communication protocol controller 220 extracts the receive preGPIO data RX_preGPIO_data, and converts the extracted data into parallel data based on the timing at which the data is transmitted to convert the same into the receive protocol data RX_prct_data.

In this regard, the receive protocol data TX_prtc_data may include at least one protocol data according to the corresponding communication protocol. For example, when the protocol of the receive protocol data RX_prtc_data received from the Pre-GPIO data converter 230 is the SPI (Serial Peripheral Interface) communication protocol, the communication protocol controller 220 may receive the receive protocol data RX_prtc_data including the SPI receive data SPI_RXD as the protocol data, and may convert the receive protocol data RX_prtc_data into the input data RX_data, and may transmit the input data RX_data to the serial/parallel converter 210, as shown in FIG. 5 and FIG. 6B. Although described based on the SPI protocol, the present disclosure is not limited thereto. As described above, the receive protocol data RX_prtc_data may include data transmitted via at least one line according to the corresponding communication protocol. For example, the communication protocol controller 220 may convert the receive protocol data RX_prtc_data based on the serial communication protocols such as the I2C (Inter-Integrated Circuit) communication protocol and the UART (Universal Asynchronous Receiver/Transmitter) communication protocol other than the SPI communication protocol into the input data RX_data. The receive protocol data RX_prtc_data may be data of a communication protocol other than the aforementioned communication protocol.

Furthermore, the communication protocol controller 220 may receive transmission speed data, and data about a size of one-time transmitted or received data from the processor 100, and may set a speed at which the transmit protocol data TX_prtc_data is transmitted, and the receive protocol data RX_prct_data is received, and the size of one-time transmitted or received data. For example, the communication protocol controller 220 may set the transmission speed to 10 ns, and may set the size of one-time transmitted data to 8 bits.

The pre-GPIO data converter 230 converts transmit protocol data TX_prct_data received from communication protocol controller 220 into transmit preGPIO data TX_preGPIO_data and transmits the transmit preGPIO data TX_preGPIO_data to the GPIO input/output unit 300 via the bus 1000. The pre-GPIO data converter 230 converts receive preGPIO data RX_preGPIO_data received from the GPIO output unit 300 into receive protocol data RX_prct_data and transmits the receive protocol data RX_prct_data to the communication protocol controller 220 via the bus 1000. To this end, the Pre-GPIO data converter 230 includes a transmit data converter 231, a receive data converter 232, and a transmit/receive controller 233.

As shown in FIG. 7, the transmit data converter 231 converts the transmit protocol data TX_prct_data received from the communication protocol controller 220 into the transmit preGPIO data TX_preGPIO_data and transmits the transmit preGPIO data TX_preGPIO_data to the transmit/receive controller 233. Specifically, the transmit data converter 231 extracts the transmit protocol data TX_prct_data based on a timing at which the data is transmitted, and converts the extracted data into the transmit preGPIO data TX_preGPIO_data. That is, the transmit data converter 231 converts the transmit protocol data TX_prct_data transmitted in parallel into serial data based on the timing at which the data is transmitted to convert the same into the transmit preGPIO data TX_preGPIO_data. For example, when the communication protocol of the transmit protocol data TX_prtc_data is the SPI communication protocol, the transmit data converter 231 receives the transmit protocol data TX_prtc_data including the SPI clock data SPI_CLK, the SPI chip select data SPI_CS, and the SPI transmit data SPI_TXD from the communication protocol controller 220. As shown in FIG. 8A, the transmit data converter 231 may divide the received transmit protocol data TX_prct_data including the SPI clock data SPI_CLK, the SPI chip select data SPI_CS, and the SPI transmit data SPI_TXD based on the timing at which the data is transmitted to convert the received transmit protocol data TX_prct_data into the transmit preGPIO data TX_preGPIO_data. That is, the transmit data converter 231 converts the transmit protocol data TX_prct_data transmitted in parallel into the serial data based on the timing at which the data is transmitted to convert the same into the transmit preGPIO data TX_preGPIO_data. Accordingly, the transmit data converter 231 may convert the SPI clock data SPI_CLK, the SPI chip select data SPI_CS, and the SPI transmit data SPI_TXD to the transmit preGPIO data TX_preGPIO_data including "0", "1" and "0" as respective values of the SPI clock data SPI_CLK, the SPI chip select data SPI_CS, and the SPI transmit data SPI_TXD transmitted at a first timing, and may convert the SPI clock data SPI_CLK, the SPI chip select data SPI_CS, and the SPI transmit data SPI_TXD to the transmit preGPIO data TX_preGPIO_data including "0", "1" and "0" as respective values of the SPI clock data SPI_CLK, the SPI chip select data SPI_CS, and the SPI transmit data SPI_TXD transmitted at a second timing.

According to an embodiment of the present disclosure, the transmit preGPIO data TX_preGPIO_data is composed of the number of bits corresponding to the number of GPIO pads. Specifically, the transmit data converter 231 may receive transmit bit data as data about data transmit bits corresponding to the GPIO pads 3000 allocated to communication of the output data TX_data, from the processor 100. Accordingly, for example, a fifth GPIO pad, a sixth GPIO pad, and a seventh GPIO pad of the GPIO pads 3000 may be allocated to the output data TX_data transmission. Thus, the transmit data converter 231 may receive, from the processor 100, the data indicating that the fifth bit, the sixth bit, and the seventh bit are allocated to the communication of the output data TX_data as the data indicating the data transmit bits corresponding to the allocated GPIO pads. As shown in FIG. 8A, the transmit preGPIO data TX_preGPIO_data composed of 12 bits corresponding to the 12 GPIO pads includes the SPI clock data SPI_CLK, the SPI chip select data SPI_CS and the SPI transmit data SPI_TXD output at the same timing in the 5th, 6th and 7th bits, respectively.

To this end, although not shown, the transmit data converter 231 may include a transmit register that receives the transmit protocol data TX_prtc_data, and a transmit bit select setting unit for generating the transmit preGPIO data TX_preGPIO_data in which the transmit protocol data TX_prtc_data is included in the corresponding bit, using the transmit bit data.

As shown in FIG. 7, the receive data converter 232 converts the receive preGPIO data RX_preGPIO_data received from the transmit/receive controller 233 into the receive protocol data RX_prct_data and transmits the receive protocol data RX_prct_data to the input/output data converter 200. For example, when the communication protocol of the receive protocol data RX_prtc_data is the SPI communication protocol, the receive data converter 232 sequentially receives the receive preGPIO data RX_preGPIO_data, and converts the receive preGPIO data RX_preGPIO_data into the receive protocol data RX_prct_data including the SPI receive data SPI_RXD and transmits the receive protocol data RX_prct_data to the input/output data converter 200, as shown in FIG. 8B.

According to an embodiment of the present disclosure, the receive preGPIO data RX_preGPIO_data is composed of the number of bits corresponding to the number of the GPIO pads. Specifically, the transmit data converter 231 may receive data about data receive bits corresponding to the GPIO pads 3000 to which the receive protocol data RX_prct_data is output, from the processor 100. Accordingly, for example, the eighth pad of the GPIO pad 3000 from the processor 100 is allocated to the reception of the input data RX_data, and the receive data converter 232 receives data indicating that the eighth bit is allocated to the reception of the input data RX_data as the data about the data receive bit corresponding to the allocated GPIO pad from the processor 100. As shown in FIG. 8B, the receive data converter 232 may extract the 8th bit of the receive preGPIO data RX_preGPIO_data composed of 12 bits corresponding to the 12 GPIO pads to convert the same into the receive protocol data RX_prct_data.

To this end, although not shown, the receive data converter 232 may include a receive register that receives the receive preGPIO data RX_preGPIO_data received from the transmit/receive controller 233, and a receive bit select setting unit for extracting the data of the corresponding bit from the receive preGPIO data RX_preGPIO_data using the receive bit data received from the processor 100 to generate the protocol data RX_prct_data.

The transmit/receive controller 233 transmits the converted transmit preGPIO data TX_preGPIO_data from the transmit data converter 231 along with an address ADDR of the GPIO pad to which the transmit preGPIO data TX_preGPIO_data is to be output to the GPIO input/output unit 300 via the bus 1000. The transmit/receive controller 233 transmits the receive preGPIO data RX_preGPIO_data received from the GPIO input/output unit 300 to the receive data converter 232. To this end, although not shown, the transmit/receive controller 233 may include an address setting unit for setting an address to which the transmit preGPIO data TX_preGPIO_data or the receive preGPIO data RX_preGPIO_data is to be transmitted, and a timing controller for controlling transmission or reception of the data in response to a timing of the communication protocol.

According to an embodiment of the present disclosure, the input/output data converter 200 converts the transmit protocol data TX_prtc_data into the transmit preGPIO data TX_preGPIO_data and transmits the transmit preGPIO data TX_preGPIO_data to the GPIO input/output unit 300 via the bus 1000. The input/output data converter 200 converts the receive preGPIO data RX_preGPIO_data input from the GPIO input/output unit 300 via the bus 1000 into the receive protocol data RX_prtc_data. Thus, the line patterns for outputting the transmit protocol data TX_prtc_data and the receive protocol data RX_prtc_data via the GPIO pads 3000 may be omitted to reduce the complexity of the internal line pattern and minimize the area of the semiconductor device.

The GPIO input/output unit 300 converts the transmit preGPIO data TX_preGPIO_data into the transmit GPIO data TX_GPIO_data and transmits the transmit GPIO data TX_GPIO_data to at least one GPIO pad 3000. Furthermore, the GPIO input/output unit 300 converts the receive GPIO data RX_GPIO_data to the receive preGPIO data RX_preGPIO_data and transmits the receive preGPIO data RX_GPIO_data to the input/output data converter 200. Specifically, the GPIO input/output unit 300 may convert the transmit preGPIO data TX_preGPIO_data received from the input/output data converter 200 to the transmit GPIO data TX_GPIO_data by applying a transmit mask TX_MASK to the transmit preGPIO data TX_preGPIO_data so that only the GPIO pad 3000 allocated to the communication of the corresponding data is controlled. Then, the GPIO input/output unit 300 may transmit the transmit GPIO data TX_GPIO_data to at least one GPIO pad 3000. To this end, the GPIO input/output unit 300 includes a GPIO data converter 310, a GPIO output unit 320, and a GPIO input unit 330.

The GPIO data converter 310 converts the transmit preGPIO data TX_preGPIO_data into the transmit GPIO data TX_GPIO_data. Specifically, the GPIO data converter 310 converts the transmit preGPIO data TX_preGPIO_data received from the input/output data converter 200 to the transmit GPIO data TX_GPIO_data by applying the transmit mask TX_MASK to the transmit preGPIO data TX_preGPIO_data to extract only the data bits corresponding to the GPIO pad 3000 allocated to the communication of the corresponding data from the transmit preGPIO data TX_preGPIO_data received from the input/output data converter 200. For example, as shown in FIG. 10A, the GPIO data converter 310 may apply, to the transmit preGPIO data TX_preGPIO_data, the transmit mask TX_MASK in which each of the fifth bit, the sixth bit, and the seventh bit has a value of "1", and the other bits have a value of "0" such that only to the fifth bit, the sixth bit, and the seventh bit as data bits corresponding to the GPIO pad 3000 allocated to the communication of the corresponding data are extracted from the transmit preGPIO data TX_preGPIO_data. Thus, the transmit preGPIO data TX_preGPIO_data may be converted to the transmit GPIO data TX_GPIO_data including values of the fifth bit, the sixth bit, and the seventh bit of each transmit preGPIO data TX_preGPIO_data.

Furthermore, the GPIO data converter 310 converts the receive GPIO data RX_GPIO_data received from at least one GPIO pad 3000 to the receive preGPIO data RX_preGPIO_data by applying a receive mask RX_MASK to the receive GPIO data RX_GPIO_data to extract only the data bits corresponding to the GPIO pad 3000 allocated to the communication of the corresponding data therefrom. For example, as shown in FIG. 10B, the GPIO data converter 310 may apply, to the receive GPIO data RX_GPIO_data, the receive mask RX_MASK in which the eighth bit has the value of "1" and the other bits have a value of "0" such that only the eighth bit as the data bit corresponding to the GPIO pad 3000 allocated to the communication of the corresponding data is extracted therefrom. Thus, the receive GPIO data RX_GPIO_data may be converted to the receive preGPIO data RX_preGPIO_data including the value of the 8th bit of each receive GPIO data RX_GPIO_data to receive GPIO data RX_GPIO_data.

The GPIO output unit 320 outputs the transmit GPIO data TX_GPIO_data transmitted from the GPIO data converter 310 via the GPIO input/output line 2000 and at least one GPIO pad 3000.

The GPIO input unit 330 receives the receive GPIO data RX_GPIO_data received via the at least one GPIO pad 3000 via the GPIO input/output line 2000 and the at least one GPIO pad 3000.

Hereinafter, with reference to FIGS. 11 to 14, an internal communication method in a semiconductor device according to an embodiment of the present disclosure will be described in detail.

Figure 11:
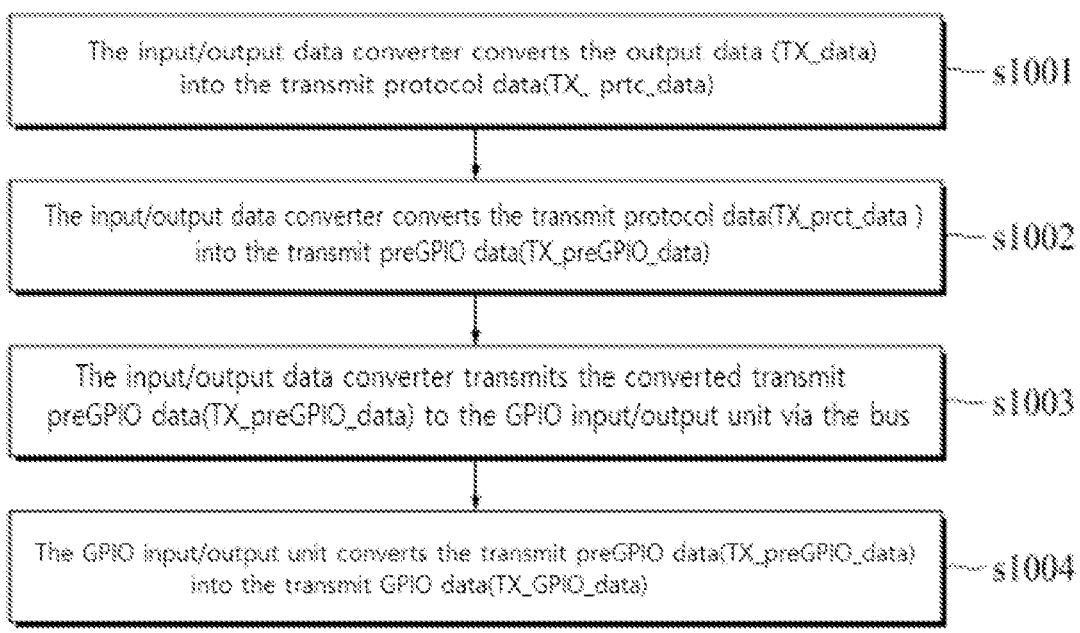
FIG. 11 is a flowchart of a data transmit method in a semiconductor device according to an embodiment of the present disclosure.
Figure 12:
FIG. 12 is a diagram illustrating data resulting from conversion according to a data transmit method in a semiconductor device according to an embodiment of the present disclosure.
Figure 13:
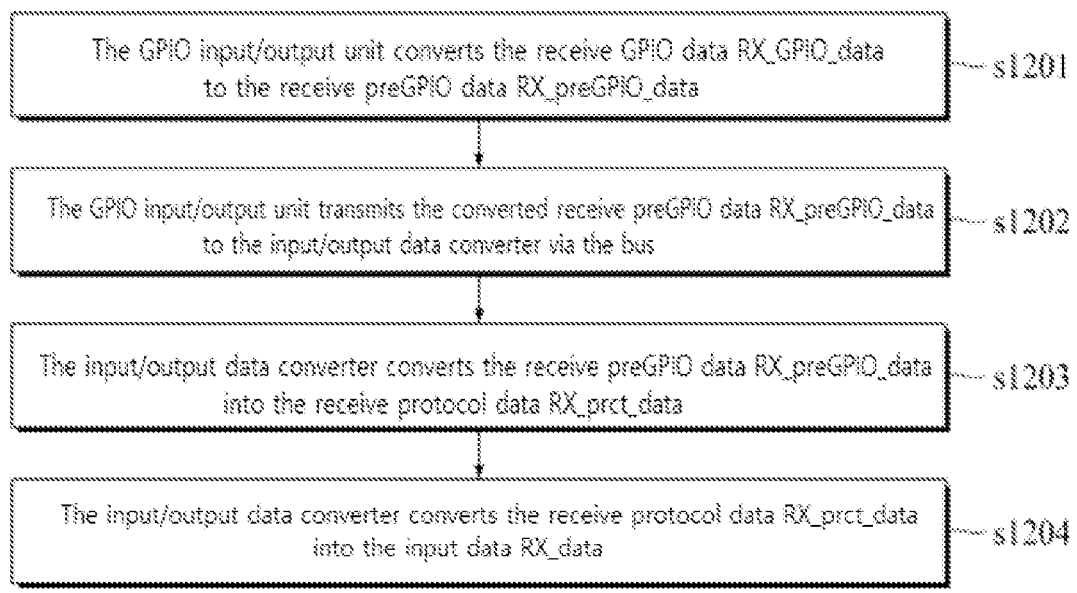
FIG. 13 is a flowchart of a data reception method in a semiconductor device according to an embodiment of the present disclosure.
Figure 14:
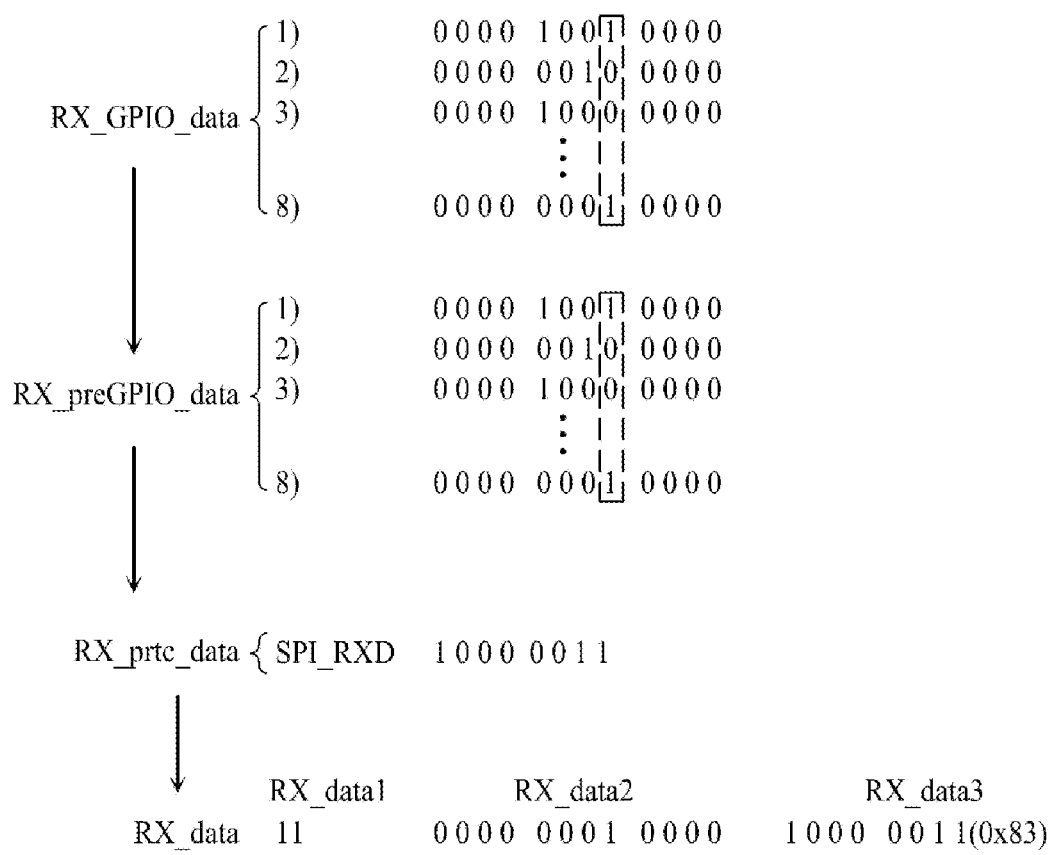
FIG. 14 is a diagram illustrating data resulting from conversion according to a data reception method in a semiconductor device according to an embodiment of the present disclosure.

FIG. 11 is a flow chart of a data transmit method in a semiconductor device according to an embodiment of the present disclosure. FIG. 12 is a diagram illustrating data resulting from conversion according to a data transmit method in a semiconductor device according to an embodiment of the present disclosure. FIG. 13 is a flowchart of a data reception method in a semiconductor device according to an embodiment of the present disclosure. FIG. 14 is a diagram illustrating data resulting from conversion according to a data reception method in a semiconductor device according to an embodiment of the present disclosure.

Referring to FIG. 11 and FIG. 12, a data transmit method in a semiconductor device according to an embodiment of the present disclosure is described in detail.

First, although not shown, the input/output data converter 200 may convert the output data TX_data received from the processor 100 into serial or parallel data.

Then, the input/output data converter 200 converts the output data TX_data received from the processor 100 into the transmit protocol data TX_prtc_data corresponding to the communication protocol of the output data TX_data in s1001. For example, when the protocol of the output data TX_data is the SPI (Serial Peripheral Interface) communication protocol, the input/output data converter 200 converts the output data TX_data into the transmit protocol data TX_prtc_data including the SPI clock data SPI_CLK, the SPI chip select data SPI_CS, and the SPI transmit data SPI_TXD according to the SPI communication protocol as shown in FIG. 11. In this regard, the output data TX_data may include the first to third output data TX_data1 to TX_data3, as shown in FIG. 12. The first output data TX_data1 indicates information about the communication protocol of the output data TX_data, and may have different values depending on the communication protocol of the output data TX_data. The second output data TX_data2 indicates information about a GPIO pad from which the data is output among the GPIO pads 3000. Furthermore, the third output data TX_data3 may include the data processed by the processor 100 as described above. For example, the output data TX_data may include the first output data TX_data1 having a value of "11(2)" indicating the SPI protocol, the second output data TX_data2 having a value of "0000 1111 0000" indicating using middle 4 GPIO pads among 12 GPIO pads, and the third output data TX_data3 as the data processed by the processor 100 having a value of "0101 1010(0x5A)". Although not shown, like the output data TX_data, the input data RX_data may include first input data RX_data1 as information about a communication protocol, second input data RX_data2 as information about a GPIO pad to which the data is input among the GPIO pads 3000, and third input data RX_data3 as the data input to the GPIO pad. Although described based on the SPI protocol, the present disclosure is not limited thereto. The input/output data converter 200 converts the output data TX_data the transmit protocol data TX_prtc_data based on other communication protocols.

Then, the input/output data converter 200 converts the transmit protocol data TX_prct_data into the transmit preGPIO data TX_preGPIO_data in s1002. Specifically, the input/output data converter 200 converts the transmit protocol data TX_prct_data into the transmit preGPIO data TX_preGPIO_data by dividing the transmit protocol data TX_prct_data based on the timing at which the data is transmitted. That is, the transmit data converter 231 converts the transmit protocol data TX_prct_data transmitted in parallel into serial data based on the timing at which the data is transmitted to convert the same into the transmit preGPIO data TX_preGPIO_data. For example, when the communication protocol of the transmit protocol data TX_prtc_data is the SPI communication protocol, the input/output data converter 200 may extract the transmit protocol data TX_prct_data including the SPI clock data SPI_CLK, the SPI chip select data SPI_CS, and the SPI transmit data SPI_TXD based on the timing at which the data is transmitted to convert the transmit protocol data TX_prct_data into the transmit preGPIO data TX_preGPIO_data. That is, the transmit data converter 231 converts the transmit protocol data TX_prct_data transmitted in parallel into serial data based on the timing at which the data is transmitted to convert the transmit protocol data TX_prct_data into the transmit preGPIO data TX_preGPIO_data. Accordingly, the transmit data converter 231 may convert the transmit protocol data TX_prct_data to the transmit preGPIO data TX_preGPIO_data including "0", "1" and "0" as respective values of the SPI clock data SPI_CLK, the SPI chip select data SPI_CS, and the SPI transmit data SPI_TXD transmitted at a first timing, and may convert the transmit protocol data TX_prct_data to the transmit preGPIO data TX_preGPIO_data including "0", "1" and "0" as respective values of the SPI clock data SPI_CLK, the SPI chip select data SPI_CS, and the SPI transmit data SPI_TXD transmitted at a second timing. According to an embodiment of the present disclosure, the transmit preGPIO data TX_preGPIO_data is composed of the number of bits corresponding to GPIO pads. Specifically, the transmit data converter 231 may receive transmit bit data as data about data transmit bits corresponding to the GPIO pads 3000 allocated to communication of the output data TX_data, from the processor 100. Accordingly, for example, a fifth GPIO pad, a sixth GPIO pad, and a seventh GPIO pad of the GPIO pads 3000 may be allocated to the output data TX_data transmission. Thus, the transmit data converter 231 may receive, from the processor 100, the data indicating that the fifth bit, the sixth bit, and the seventh bit are allocated to the communication of the output data TX_data as the data indicating the data transmit bits corresponding to the allocated GPIO pads. As shown in FIG. 12, the transmit preGPIO data TX_preGPIO_data composed of 12 bits corresponding to the 12 GPIO pads includes the SPI clock data SPI_CLK, the SPI chip select data SPI_CS and the SPI transmit data SPI_TXD output at the same timing in the 5th, 6th and 7th bits, respectively.

Then, the input/output data converter 200 transmits the converted transmit preGPIO data TX_preGPIO_data to the GPIO input/output unit 300 via the bus 1000 in s1003. According to an embodiment of the present disclosure, the transmit preGPIO data TX_preGPIO_data is transmitted from the input/output data converter 200 to the GPIO input/output unit 300 via the bus 1000 rather than a separate line pattern, such that the complexity of the internal line pattern may be reduced.

Then, the GPIO input/output unit 300 converts the transmit preGPIO data TX_preGPIO_data into the transmit GPIO data TX_GPIO_data in s1004. Specifically, the GPIO input/output unit 300 may convert the transmit preGPIO data TX_preGPIO_data received from the input/output data converter 200 to the transmit GPIO data TX_GPIO_data by applying the transmit mask TX_MASK to the transmit preGPIO data TX_preGPIO_data so that only the GPIO pad 3000 allocated to the communication of the corresponding data is controlled. For example, as shown in FIG. 12, the GPIO input/output unit 300 may apply, to the transmit preGPIO data TX_preGPIO_data, the transmit mask TX_MASK in which each of the fifth bit, the sixth bit, and the seventh bit has a value of "1", and the other bits have a value of "0" such that only to the fifth bit, the sixth bit, and the seventh bit as data bits corresponding to the GPIO pad 3000 allocated to the communication of the corresponding data are extracted from the transmit preGPIO data TX_preGPIO_data. Thus, the transmit preGPIO data TX_preGPIO_data may be converted to the transmit GPIO data TX_GPIO_data including values of the fifth bit, the sixth bit, and the seventh bit of each transmit preGPIO data TX_preGPIO_data.

A data reception method in a semiconductor device according to an embodiment of the present disclosure is described in detail with reference to FIGS. 13 and 14.

First, the GPIO input/output unit 300 converts the receive GPIO data RX_GPIO_data to the receive preGPIO data RX_preGPIO_data in s1201. Specifically, the GPIO input/output unit 300 converts the receive GPIO data RX_GPIO_data received from at least one GPIO pad 3000 to the receive preGPIO data RX_preGPIO_data by applying the receive mask RX_MASK to the receive GPIO data RX_GPIO_data to extract only the data bits corresponding to the GPIO pad 3000 allocated to the communication of the corresponding data therefrom. For example, as shown in FIG. 14, the GPIO input/output unit 300 may apply, to the receive GPIO data RX_GPIO_data, the receive mask RX_MASK in which the eighth bit has the value of "1" and the other bits have a value of "0" such that only the eighth bit as the data bit corresponding to the GPIO pad 3000 allocated to the communication of the corresponding data is extracted therefrom. Thus, the receive GPIO data RX_GPIO_data may be converted to the receive preGPIO data RX_preGPIO_data including the value of the 8th bit of each receive GPIO data RX_GPIO_data to receive GPIO data RX_GPIO_data.

Thereafter, the GPIO input/output unit 300 transmits the converted receive preGPIO data RX_preGPIO_data to the input/output data converter 200 via the bus 1000 in s1202. According to an embodiment of the present disclosure, the receive preGPIO data RX_preGPIO_data is transmitted from the GPIO input/output unit 300 to the input/output data converter 200 via the bus rather than a separate line pattern, such that the complexity of the internal line pattern may be reduced.

Then, the input/output data converter 200 converts the receive preGPIO data RX_preGPIO_data into the receive protocol data RX_prct_data in s1203. Specifically, the input/output data converter 200 extracts the receive preGPIO data RX_preGPIO_data based on the timing at which the data is transmitted to convert the receive preGPIO data RX_preGPIO_data into the receive protocol data RX_prct_data. That is, the transmit data converter 231 converts the transmit protocol data TX_prct_data transmitted in parallel into the serial data based on the timing at which the data is transmitted to convert the transmit protocol data TX_prct_data into the transmit preGPIO data TX_preGPIO_data. Accordingly, the receive protocol data RX_prct_data may include data transmitted via at least one line according to the corresponding communication protocol. For example, when the protocol of the receive protocol data RX_prtc_data is the SPI (Serial Peripheral Interface) communication protocol, the input/output data converter 200 converts the receive preGPIO data RX_preGPIO_data into the receive protocol data RX_prtc_data including the SPI receive data SPI_RXD as shown in FIG. 14. According to an embodiment of the present disclosure, the receive preGPIO data RX_preGPIO_data is composed of the number of bits corresponding to the number of GPIO pads. Specifically, the transmit data converter 231 may receive the data about the data receive bit corresponding to the GPIO pads 3000 to which the receive protocol data RX_prct_data is output from the processor 100 and may convert the receive preGPIO data RX_preGPIO_data into the receive protocol data RX_prtc_data using the data about the data receive bit. For example, the receive data converter 232 receives the data indicating that the eighth bit is allocated to communication of the input data RX_data as the data about the data receive bit corresponding to the allocated GPIO pad. Thus, as shown in FIG. 14, the receive data converter 232 may extract the 8th bit of the receive preGPIO data RX_preGPIO_data composed of 12 bits corresponding to the 12 GPIO pads to convert the same into the receive protocol data RX_prct_data.

Thereafter, the input/output data converter 200 converts the receive protocol data RX_prct_data into the input data RX_data in s1204. For example, when the protocol of the receive protocol data RX_prtc_data is the SPI (Serial Peripheral Interface) communication protocol, the input/output data converter 200 receives the receive protocol data RX_prtc_data including the SPI receive data SPI_RXD, and converts the receive protocol data RX_prtc_data into the input data RX_data including the first input data RX_data1, the second input data RX_data2, and the third input data RX_data3 as shown in FIG. 14. That is, as shown in FIG. 14, the receive protocol data RX_prct_data including the SPI receive data SPI_RXD having a value of "10000011(0x83)" may be converted to the input data RX_data including the first input data RX_data1 having a value of "11 2" indicating the SPI protocol, the second input data RX_data2 having a value of "0000 11110000" indicating using the middle 4 GPIO pads among 12 GPIO pads, and the third input data TX_data3 having a value of "01011010(0x83)" as the receive protocol data RX_prct_data.

Then, although not shown, the input/output data converter 200 may convert the input data RX_data into serial or parallel data and transmit the converted data to the processor 100.

Those skilled in the art to which the present disclosure belongs will be able to understand that the above-described present disclosure may be implemented in other specific forms without changing its technical spirit or essential features.

Furthermore, the methods as described in the present disclosure may be implemented, at least partially, using one or more computer programs or components. This component may be provided as a set of computer instructions via computer readable or machine readable media, including volatile and nonvolatile memory. The instructions may be provided as software or firmware, and may be implemented in whole or in part in hardware component such as ASICs, FPGAs, DSPs, or other similar devices. The instructions may be configured to be executed by one or more processors or other hardware components, wherein the processor or other hardware component performs or is configured to perform all or some of the methods and procedures as disclosed in the present disclosure when executing the set of computer instructions.

Therefore, it should be understood that the embodiments as described above are not limiting but illustrative in all respects. The scope of the present disclosure is indicated by the following claims rather than the detailed description, and all changes or modifications derived from the meaning and scope of the claims and their equivalent concepts should be interpreted to be included in the scope of the present disclosure.

What is claimed is:

1. A semiconductor device comprising:
an input/output data converter configured to receive output data via a bus, convert the output data into transmit pre-general-purpose input/output (preGPIO) data, and transmit the transmit preGPIO data to the bus; and
a general-purpose input/output (GPIO) input/output unit configured to receive the transmit preGPIO data via the bus, convert the transmit preGPIO data into transmit GPIO data, and output the transmit GPIO data to at least one GPIO pad,
wherein the input/output data converter is configured to convert the output data into transmit protocol data corresponding to a communication protocol of the output data, and convert the transmit protocol data into the transmit preGPIO data.

2. The semiconductor device of claim 1, wherein the input/output data converter is configured to extract the transmit protocol data based on a timing to convert the transmit protocol data to the transmit preGPIO data.

3. The semiconductor device of claim 1, wherein the transmit protocol data includes at least one protocol data transmitted in parallel via at least one line, and
wherein the input/output data converter is configured to convert the at least one protocol data into serial data based on a timing to convert the transmit protocol data into the transmit preGPIO data.

4. The semiconductor device of claim 1, wherein the transmit preGPIO data is composed of a number of bits corresponding to a number of GPIO pads, and
wherein the input/output data converter is configured to:
receive data about a data transmit bit corresponding to a GPIO pad allocated to communication of the output data; and
convert the transmit protocol data to the transmit preGPIO data including serial data in the data transmit bit of the transmit preGPIO data, wherein the transmit protocol data is converted to the serial data based on a timing.

5. The semiconductor device of claim 1, wherein the GPIO input/output unit is configured to convert the transmit preGPIO data into the transmit GPIO data by applying a transmit mask to the transmit preGPIO data to extract only a bit corresponding to a GPIO pad allocated to communication of the transmit preGPIO data.

6. The semiconductor device of claim 1, wherein the GPIO input/output unit is configured to convert receive GPIO data received from the at least one GPIO pad into receive preGPIO data and transmit the receive preGPIO data to the input/output data converter via the bus, and wherein the input/output data converter is configured to convert the receive preGPIO data into input data and transmit the input data via the bus.

7. The semiconductor device of claim 6, wherein the input/output data converter is configured to convert the receive preGPIO data into parallel data based on a timing to convert the receive preGPIO data into receive protocol data, and
wherein the receive protocol data includes at least one protocol data transmitted in parallel via at least one line.

8. The semiconductor device of claim 6, wherein the GPIO input/output unit is configured to convert the receive GPIO data into the transmit preGPIO data by applying a receive mask to the receive GPIO data to extract only a bit corresponding to a GPIO pad allocated to communication of the receive GPIO data.

9. A communication method in a semiconductor device, the method comprising:
receiving, by an input/output data converter, output data via a bus;
converting, by the input/output data converter, the output data into transmit protocol data;
converting, by the input/output data converter, the transmit protocol data into transmit pre-general-purpose input/output (preGPIO) data;
converting, by a general-purpose input/output (GPIO) input/output unit, the transmit preGPIO data into transmit GPIO data; and
transmitting, by the GPIO input/output unit, the transmit GPIO data to a GPIO pad via the bus.

10. The method of claim 9, wherein the transmit protocol data includes at least one protocol data transmitted in parallel, and
wherein the converting of the transmit protocol data into the transmit preGPIO data includes converting, by the input/output data converter, the at least one protocol data into serial data based on a timing to convert the transmit protocol data into the transmit preGPIO data.

11. The method of claim 9, wherein the transmit preGPIO data is composed of a number of bits corresponding to a number of GPIO pads, and
wherein the converting of the transmit protocol data into the transmit preGPIO data includes:
receiving, by the input/output data converter, data about a data transmit bit corresponding to a GPIO pad allocated to communication of the output data; and
converting, by the input/output data converter, the transmit protocol data to the transmit preGPIO data including serial data in the data transmit bit of the transmit preGPIO data, wherein the transmit protocol data is converted to the serial data based on a timing.

12. The method of claim 9, wherein the converting, by the GPIO input/output unit, of the transmit preGPIO data into the transmit GPIO data includes converting, by the GPIO input/output unit, the transmit preGPIO data into the transmit GPIO data by applying a transmit mask to the transmit preGPIO data to extract only a bit corresponding to a GPIO pad allocated to communication of the transmit preGPIO data.

13. The method of claim 9, wherein the method further comprises:
receiving, by the GIPO input/output unit, receive GPIO data from the GPIO pad via the bus;

converting, by the GIPO input/output unit, the receive GPIO data into receive preGPIO data;

converting, by the input/output data converter, the receive preGPIO data into receive protocol data;

converting, by the input/output data converter, the receive protocol data into input data; and transmitting, by the input/output data converter, the input data via the bus.

14. The method of claim 13, wherein the receive protocol data includes at least one protocol data transmitted in parallel via at least one line, and
wherein the converting, by the input/output data converter, of the receive preGPIO data into the receive protocol data includes converting, by the input/output data converter, the receive preGPIO data into parallel data based on a timing to convert the receive preGPIO data into receive protocol data including the at least one protocol data.

15. The method of claim 13, wherein the converting, by the GPIO input/output unit, of the receive GPIO data into the receive preGPIO data includes converting, by the GPIO input/output unit, the receive GPIO data into the transmit preGPIO data by applying a receive mask to the receive GPIO data to extract only a bit corresponding to a GPIO pad allocated to communication of the receive GPIO data.

16. An electronic device, comprising:
an input/output data converter configured to receive output data, convert the output data into transmit pre-general-purpose input/output (preGPIO) data, and transmit the transmit preGPIO data; and
a general-purpose input/output (GPIO) input/output unit configured to receive the transmit preGPIO data, convert the transmit preGPIO data into transmit GPIO data, and output the transmit GPIO data to at least one GPIO pad,
wherein the input/output data converter is configured to convert the output data into transmit protocol data corresponding to a communication protocol of the output data, and convert the transmit protocol data into the transmit preGPIO data.

17. The electronic device of claim 16, wherein the input/output data converter is configured to extract the transmit protocol data based on a timing to convert the transmit protocol data to the transmit preGPIO data.

18. The electronic device of claim 16, wherein the transmit protocol data includes at least one protocol data transmitted in parallel via at least one line, and
wherein the input/output data converter is configured to convert the at least one protocol data into serial data based on a timing to convert the transmit protocol data into the transmit preGPIO data.

19. The electronic device of claim 16, wherein the transmit preGPIO data is composed of a number of bits corresponding to a number of GPIO pads, and
wherein the input/output data converter is configured to:
receive data about a data transmit bit corresponding to a GPIO pad allocated to communication of the output data; and
convert the transmit protocol data to the transmit preGPIO data including serial data in the data transmit bit of the transmit preGPIO data, wherein the transmit protocol data is converted to the serial data based on a timing.

20. The electronic device of claim 16, wherein the GPIO input/output unit is configured to convert the transmit preGPIO data into the transmit GPIO data by applying a transmit mask to the transmit preGPIO data to extract only a bit corresponding to a GPIO pad allocated to communication of the transmit preGPIO data.

* * * * *